United States Patent [19]

Tanaka

[11] Patent Number: 4,540,189
[45] Date of Patent: Sep. 10, 1985

[54] STEERING SYSTEM FOR MOTORIZED CYCLES

[75] Inventor: Norio Tanaka, Tokyo, Japan

[73] Assignee: Honda Giken Kogyo Kabushiki Kaisha, Tokyo, Japan

[21] Appl. No.: 460,814

[22] Filed: Jan. 25, 1983

[30] Foreign Application Priority Data

Jan. 25, 1982 [JP] Japan ................................. 57-9775
Jun. 1, 1982 [JP] Japan ............................ 57-80891[U]

[51] Int. Cl.³ .............................................. B62K 21/00
[52] U.S. Cl. .................................. 280/270; 280/263; 280/274
[58] Field of Search ............... 280/270, 263, 274, 276, 280/279, 280

[56] References Cited

U.S. PATENT DOCUMENTS 1,175,744  3/1916  Giles ..................................... 280/270
3,511,521  5/1970  Gobini ................................. 280/270
3,521,904  7/1970  Sheffer ................................ 280/270

Primary Examiner—Joseph F. Peters, Jr.
Assistant Examiner—Donn McGiehan
Attorney, Agent, or Firm—Irving M. Weiner; Pamela S. Burt

[57] ABSTRACT

A steering system for a motorized cycle including a vehicle frame, a front suspension steerably supported by the frame, and a single front wheel integrally steerably suspended by the front suspension. The steering system comprises a handlebar, a steering stem formed to be integrally rotatable with the handlebar, another steering stem formed to be integrally rotatable with the front suspension, and a connection mechanism for operatively interconnecting the steering stems with each other.

A handlebar is permitted to be selectively set with respect to the mounting position and angle, thus being likewise also capable of being set with respect to the steering position and angle and, moreover, the structure is relatively simplified.

9 Claims, 5 Drawing Figures

4,540,189

STEERING SYSTEM FOR MOTORIZED CYCLES

BACKGROUND OF THE INVENTION

1. Field of the Invention

The present invention relates to a steering system for motorized cycles, and particularly to a steering system for a motorized cycle with a single steerable front wheel, such as a motorcycle or a motorized tricycle.

2. Description of Relevant Art

There have been proposed steering systems for a motorized cycle with a single steerable front wheel such as a motorcycle or a motorized tricycle, which include a front fork member supporting the front wheel and having the left and right upper parts thereof each secured to top and bottom bridges integrally combined with a single steering shaft supported to be leftwardly and rightwardly steerable by a head tube provided at the front part of a vehicle frame, and a handlebar arranged above and secured to the top bridge by means of handle brackets.

In such conventional steering systems, however, a handlebar has its mounting position thereof restricted in the positional relation thereof to a head tube, resulting in limitations of the steering position and angle of the handlebar.

The present invention effectively overcomes the foregoing problems in conventional steering systems for motorized cycles.

SUMMARY OF THE INVENTION

According to the present invention there is provided a steering system for a motorized cycle including a vehicle frame, a front suspension steerably supported by the frame, and a single front wheel integrally steerably suspended by the front suspension, comprising a handlebar, a first steering stem formed to be integrally rotatable with the handlebar, a second steering stem formed to be integrally rotatable with the front suspension, and a connection mechanism for operatively interconnecting the first and second steering stems with each other.

An object of the invention is to provide a steering system for a motorized cycle with a single steerable front wheel, in which a handlebar is permitted to be selectively set with respect to the mounting position and angle thereof, thus being likewise able to be set with respect to the steering position and angle and moreover, wherein the structure is relatively simplified.

Another object of the invention is to provide a steering system for a motorized cycle with a single steerable front wheel, in which the setting of relatively comfortable operating characteristics is easily obtainable.

The above and further features, objects and advantages of the invention will become more fully apparent from the following detailed description of preferred embodiments of the invention when the same is read in connection with the accompanying drawings.

DETAILED DESCRIPTION OF PREFERRED EMBODIMENTS

Figure 1:
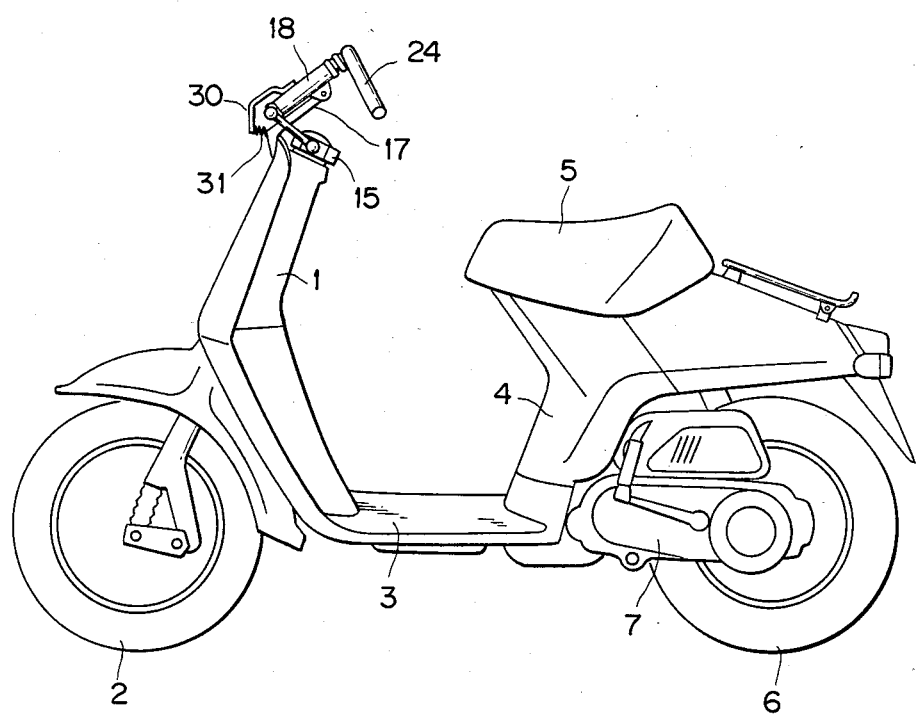
FIG. 1 is a side view of a scooter having a steering system according to a first embodiment of the invention.

Referring first to FIGS. 1 to 4 showing a scooter having a steering system according to the first embodiment of the invention, and with particular reference to FIG. 1, designated at reference numeral 1 is a cover covering a front portion of a vehicle body of the scooter. The vehicle body is provided at the front portion thereof with a front wheel 2, at the rear part of a step portion 3 thereof with an upstanding seat post 4, at the upper part of post 4 with a driver's seat 5, and at the rear lower portion thereof with a power unit 7 extending rearwardly to support a rear wheel 6, the power unit 7 comprising an engine and a transmission case and being pivoted at the front part thereof to the vehicle body so as to be swingable.

Figure 2:
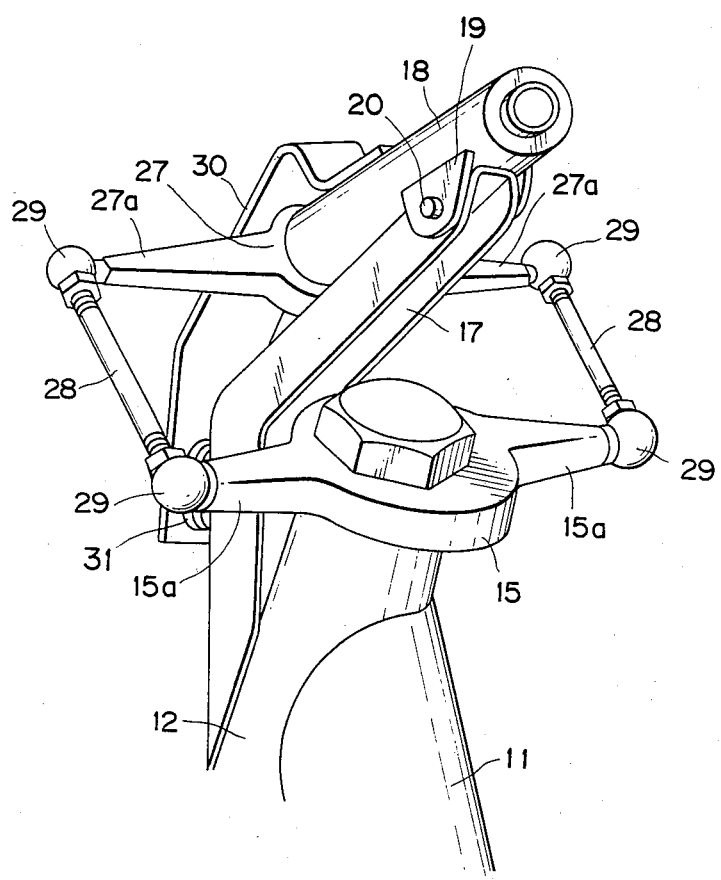
FIG. 2 is an enlarged perspective view of an essential portion including the steering system of the scooter of FIG. 1.
Figure 4:
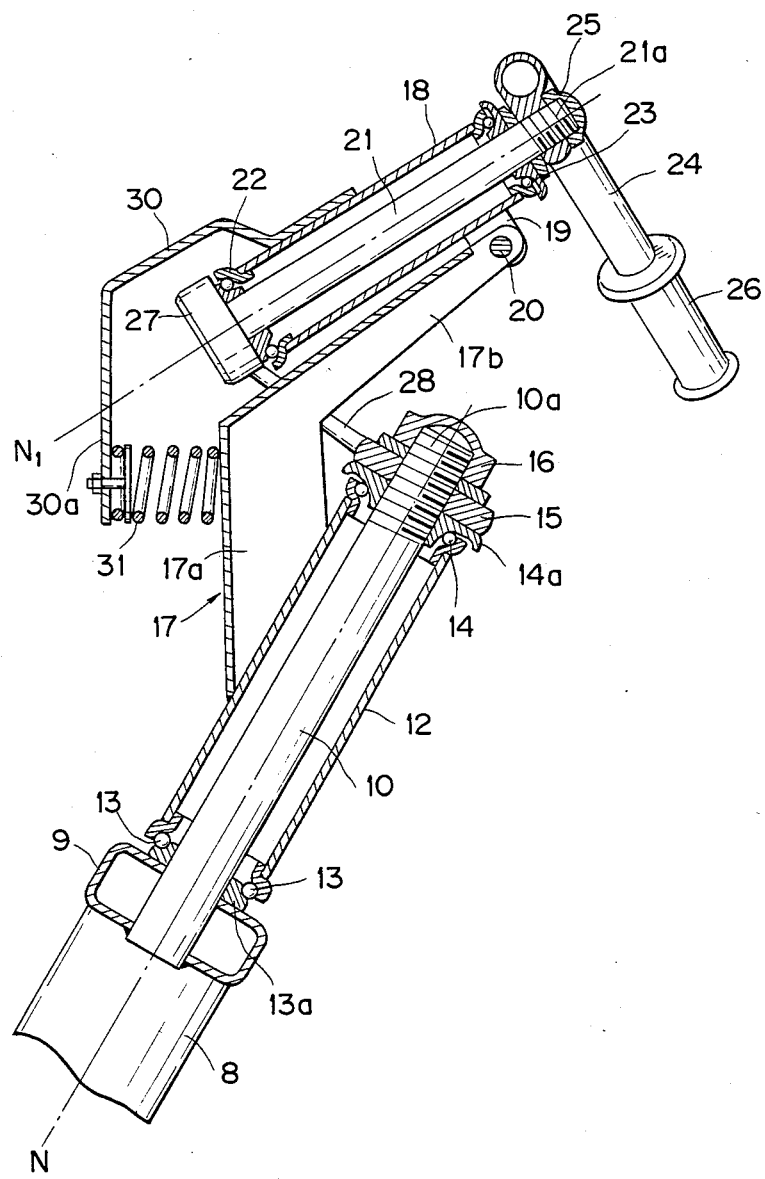
FIG. 4 is a vertical sectional view of the steering system of FIG. 3.

As will be understood from FIGS. 1 and 2, the front wheel 2 is supported by the lower part of a front fork 8 forming a suspension. The front fork 8 is constructed of left and right members (not shown) in a well-known manner, the members being interconnected with each other at the upper ends thereof by means of a bridge 9 as shown in FIG. 4. To the central part of the bridge 9 is projectingly secured a first steering stem 10.

Figure 3:
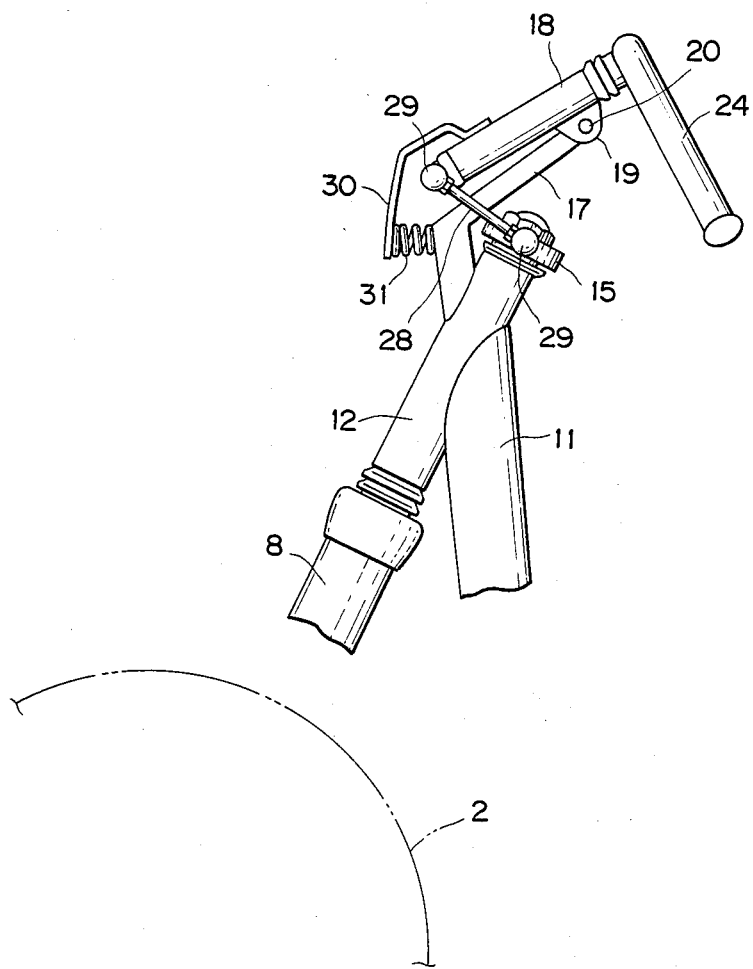
FIG. 3 is a side view of the steering system of FIG. 2.

On the other hand, at the front end of a frame 11 covered with the cover 1 as shown in FIG. 1, there is provided a head tube 12 secured thereto as shown in FIG. 3, the head tube 12 having the steering stem 10 loosely fitted therethrough as shown in FIG. 4 and rotatably supported with a pair of bearings 13, 14 provided at the upper and lower sides of the head tube 12. Above the head tube 12 there is disposed a top plate 15 corresponding to a conventional top bridge, the top plate 15 having at the central part thereof an upper projecting portion of the stem 10 inserted therethrough and extended upwardly above the head tube 12. At the distal end of the stem 10 there is formed a thread portion 10a on which a nut 16 is screwed from above to tighten the top plate 15 in the axial direction of the stem 10 so that the lower face of the top plate 15 and the upper face of the bridge 9 tighten respective confronting races 13a, 14a of bearings 13, 14.

The head tube 12 is provided on a circumferential portion thereof, at the front central part, with a supporting stay 17 projecting therefrom. The stay 17 is composed of a steel plate which is pressed or the like and is substantially L-shaped with a relatively large angle in the side view, while having a channel-like cross section. The stay 17 comprises a lower half portion 17a secured to a circumferential portion of the head tube 12, at the central part, and an upper half portion 17b extending upwardly in a rearwardly inclined relation to the axis N of the stem 10 and facing the top plate 15 from above. The upper end of the supporting stay 17 is positioned between a pair of left and right pieces of a forked bracket 19 which projects rearwardly from an upper circumferential part of a support tube 18 supporting therein a second steering stem 21. The upper part of the support tube 18 is pivoted to the upper end of the supporting stay 17 by means of a bolt 20 so as to be forwardly and rearwardly rockable above the stay 17.

The second steering stem 21 provided through the support tube 18 is adapted to be rotatable by means of a pair of bearings 22, 23 provided respectively on both ends of the support tube 18, and has a thread portion 21a projecting from the upper end of the support tube 18, to which a handle pipe 24 as a handlebar member is screwed and secured with a nut 25, the handle pipe 24 being provided at the ends thereof with a pair of grips 26. The stem 21 has a portion thereof extended outside of the lower end of the support tube 18 and provided with a connection arm 27 secured thereto at the central part thereof. As shown in FIG. 2, the arm 27 has a pair of arm portions 27a, 27a extending either leftwardly and rightwardly. On the other hand, the top plate 15 also has a pair of arm portions 15a, 15a extending leftwardly and rightwardly, and the arm portions 15a, 15a and 27a, 27a are correspondingly interconnected with each other at their outermost ends by means of a pair of connection rods 28, 28 provided therebetween with the aid of a pair of ball joints 29, 29.

Forwardly and downwardly of the support tube 18 there extends a skirt member 30 which is, as shown in FIG. 4, secured at the upper part thereof to the support tube 18 and has a spring receiving portion 30a which is bent downwardly. Between the spring receiving portion 30a and the upper part of the lower half portion 17a of the supporting stay 17 there is provided resilient means in the form of a contracted coil spring 31 normally elastically urging the skirt member 30 and thus the support tube 18 to rock clockwise in FIG. 4 about the bolt 20 as a fulcrum. Arranged in the above described manner, the second steering stem 21 connected with the handle pipe 24 is positioned such that the axis N1 thereof is inclined such that the lower and upper parts thereof extend forwards and backwards, respectively, above the first steering stem 10.

There will now be described the function and advantages of the steering system according to the first embodiment of the invention.

When the handle pipe 24 is steered either to the left or right with the handle grips 26, the second steering stem 21 correspondingly rotates, causing the arm 27 provided at the lower end thereof to turn substantially horizontally about the stem 21 as a fulcrum, thereby forwardly pulling and rearwardly pushing either of the connection rods 28, 28 and thus rotating the top plate 15 with the aid of the arm portions 15a, 15a connected with the rods 28, 28 and through respective ball joints 29, by which the rotating motion is smoothly and exactly transmitted to the top plate 15.

The rotation of the top plate 15 is transmitted to the first steering stem 10 rotatably supported by the head tube 12, thus rotating the stem 10, the torque of which is transmitted to the bridge 9 of the front fork 8, causing the front fork 8 to be correspondingly transversely rotated to effect the steering.

In the above arrangement, the steering shaft 21 is restricted against transverse movement by the support tube 18 secured by the supporting stay 17. The support tube 18 is biased with the elastic force of the spring 31 and, therefore, on the rods 28 are provided normally acting elastic forces in the pulling direction so as to absorb the backlash of the joints 29.

In the foregoing first embodiment of the invention, there has been described an an exemplary arrangement of a scooter type motorized cycle, although it will be understood that the invention may be applied to any other type of motorcycle or a motorized tricycle with a single stearable front wheel.

Figure 5:
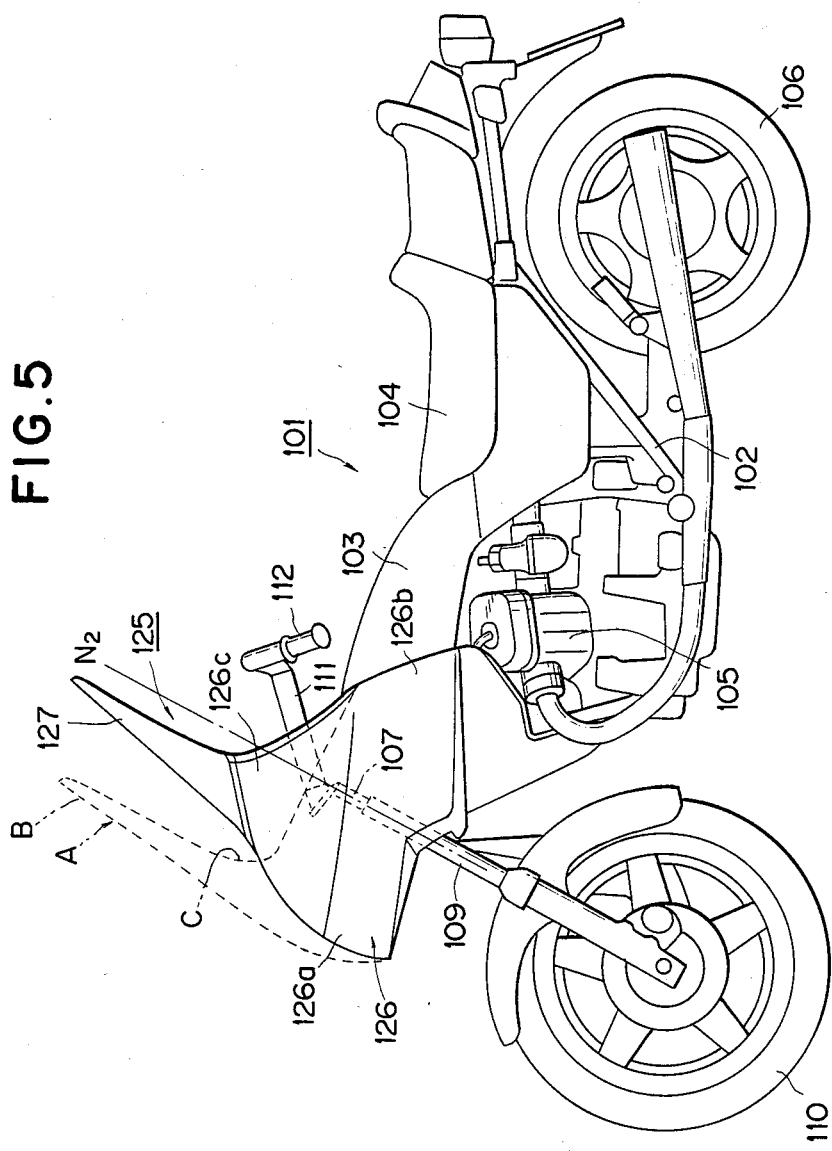
FIG. 5 is a side view of a motorcycle having a steering system according to a second embodiment of the invention.

Referring now to FIG. 5, designated at reference numeral 101 is a motorcycle having a steering system according to a second embodiment of the invention. The motorcycle 101 includes a vehicle frame 102, a fuel tank 103 disposed on a front upper portion of the frame 102, a driver's seat 104 provided behind the tank 103, an engine 105 mounted under the tank 103, and a rear wheel 106 provided near a rear lower portion of the frame 102.

The frame 102 has at the front end thereof a head tube 107 secured thereto and provided therethrough with a first steering stem (not shown) supported thereby, the first steering stem being formed to be rotatable integrally with a front suspension 109 supporting a front wheel 110. On the other hand, above the head tube 107 there is disposed a support tube 111 inclined rearwardly more than the axis $N_2$ of the head tube 107, the support tube 111 being pivoted to be forwardly and rearwardly rockable and provided therethrough with a second steering stem (not shown) supported thereby. The second steering stem is formed to be integrally rotatable with a handlebar 112 and operatively connected through a connection mechanism (not shown) with the first steering stem. The above-described steering system has a constitution substantially the same as that of the first embodiment of the invention.

The motorcycle 101 is provided at the front part thereof with a fairing member 125 comprising a fairing proper 126 having the front portion 126a thereof disposed in front of the handlebar 112 and the side portions 126b thereof extending rearwardly to both sides of the front part of the fuel tank 103 and a wind screen 127 extending upwardly from an upper portion 126c of the fairing proper 126.

In conventional steering systems in which a handlebar is disposed above a front fork or a steering shaft corresponding to the first steering stem in the above embodiment, as typically shown by a dotted line A in FIG. 5, a wind screen B is located relatively forwardly and both side portions C under the wind screen B have the edges thereof recessed downwardly, in consideration of the steering of the handlebar.

On the contrary, in the above embodiment in which the handlebar 112 is inclined and disposed rearwardly, the wind screen 127 is located relatively rearwardly and allowed to approach as close as possible an extension of the axis $N_2$ of the first steering stem in profile. Moreover, because the handlebar 112 is located rearwardly, no large recess is required to be formed between the lower part of the wind screen 127 and either of the side portions 126b, thus permitting the side portions 126b to be smoothly confluent with the rear edges of the wind screen 127 and hence to have a continuous configuration extending upwardly on the left and right. Therefore, the entire fairing member 125, particularly the wind screen 127, is allowed to be located close to the driver. Further, by continuously jointing the side portions 126b in a standing position with the wind screen 127, the fairing member 125 is enabled to have the wind shielding and fairing characteristics thereby improved, as well as the total length in the longitudinal direction of the motorcycle shortened, thus permitting the entire size to be made compact.

In the above described second embodiment, the fairing member 127 may be of any desired configuration and structure. Further, the embodiment applied to a motorcycle in the above example may be applied to motorized tricycles of a type which have a similar front structure.

I claim:

1. A steering system for a motorized cycle including a vehicle frame, a front fork steerably supported by said frame, and a front wheel integrally steerably suspended by said front fork, comprising:
   a handlebar;
   a first steering stem formed to be integrally rotatable with said front fork;
   a second steering stem formed to be integrally rotatable with said handlebar;
   connection means for operatively interconnecting said first and second steering stems with each other;
   support means for supporting said first and second steering stems relative to said vehicle frame;
   said support means including a support tube loosely fitted on and supporting said second steering stem, a head tube loosely fitted on and supporting said first steering stem and secured to said vehicle frame, and a stay member having a lower portion thereof secured to said head tube and an upper portion thereof supporting said support tube;
   said support tube being vertically rockably pivoted to said stay member; and
   a resilient means interposed between said support tube and said stay member.

2. A steering system according to claim 1, wherein: said second steering stem is inclined rearwardly more than said first steering stem.

3. A steering system according to claim 1, wherein: said connection means comprises at least one first universal joint secured to said first steering stem, at least one second universal joint secured to said second steering stem, and a rod member interposed between said first and second universal joints.

4. A steering system according to claim 3, wherein: said connection means comprises a pair of said first universal joints, a pair of said second universal joints, and a pair of said rod members; and said first universal joints and said second universal joints are disposed on both sides of said first and second steering stems, respectively.

5. A steering system according to claim 1, wherein: said support means further comprises a downwardly extending piece secured to the lower part of said support tube and said resilient means comprises a coil spring compressed to be interposed between said downwardly extending piece and said lower portion of said stay member.

6. A steering system according to claim 1, further comprising: a fairing member secured to the front part of said vehicle frame.

7. A steering system according to claim 6, wherein: said fairing member is disposed proximal said first steering stem.

8. A steering system according to claim 7, wherein: said fairing member comprises a fairing proper disposed in front of said handlebar and extending rearwardly at either side thereof, and a wind screen extending upwardly from said fairing proper, said wind screen being located substantially in longitudinal proximity to an extension of said first steering stem.

9. A steering system for a motorized cycle including a vehicle frame, a front fork steerably supported by said frame, and a front wheel integrally steerably suspended by said front fork, comprising:
   a handlebar;
   a first steering stem formed to be integrally rotatable with said front fork;
   a second steering stem formed to be integrally rotatable with said handlebar;
   connection means for operatively interconnecting said first and second steering stems with each other;
   said second steering stem being vertically rockably pivoted to said vehicle frame; and
   said second steering stem being inclined rearwardly more than said first steering stem.

* * * * *